Patented Apr. 18, 1939

2,155,260

UNITED STATES PATENT OFFICE 2,155,260

CREAM WHIPPING GAS AND METHOD OF PRODUCING WHIPPED CREAM

Isaac M. Diller, Brooklyn, N. Y.

No Drawing. Application December 29, 1937,
Serial No. 182,259

7 Claims. (Cl. 99—60)

This invention relates to a new and improved system for producing emulsified colloidal products such as emulsified milk, whipped cream, ice cream or the like.

It is an object of this invention to provide a new and improved material for producing emulsified products such as whipped cream.

It has been discovered that these emulsified products such as whipped cream can be produced by confining the milk or cream in a closed vessel and there dissolving in it nitrous oxide gas under considerable pressure. This process is applicable to milk having a wide variety of cream content which may herein be conveniently referred to as cream, although it will be understood that this term is intended to include any form of milk which will respond to the process.

Nitrous oxide gas has great solubility in cream and when so dissolved it possesses the property of interacting with the fat and protein present in such a manner that when the pressure is released it will froth up into the product commonly known as whipped cream. This gas, however, possesses several serious limitations. The first of these is that it is quite expensive. Moreover it imparts to the cream a distinct sweetish taste which is frequently not desired and the whipped cream so produced has a tendency to break down upon exposure.

In accordance with this invention there has been discovered a new gaseous substance which functions more satisfactorily at less cost. The new gas which I employ comprises primarily a composition of nitrous oxide, free nitrogen and carbon dioxide.

Within reasonable limits the proportions of these gases may be varied to suit the specific needs in any given case. A practical composition, however, consists of nitrous oxide 40% to 50%, nitrogen 30% to 40% and carbon dioxide 15% to 25%. The exact interaction of these gases in the production of whipped cream is not understood but it has been found that this composition produces a better product, more stable in use and free from unpleasant and foreign taste and at much less cost.

I am unable to explain the causes for the improved results as the interaction of the milk proteins is not clearly understood, but the new product is more effective and more free from taste than where nitrous oxide is used alone or with nitrogen. The carbon dioxide and the nitrous oxide when used within the range of proportions here given appear each to neutralize the taste of the other.

Attempts to use nitrous oxide with nitrogen have not proved satisfactory. Apparently such a gas is not sufficiently soluble to produce the desired results. This composition overcomes this defect.

Where normal cream is whipped, the product is relatively unstable and in accordance with this invention it has been found that this instability is a function of the acidity of the cream. Fresh cream in its normal state produces a whipped cream which is not very stable. In accordance with this invention it has been found that this is due to the degree of its acidity and that when the cream is made slightly more acid the stability of the whipped cream is greatly increased even before the acidity is sufficient to be sensible to the taste.

It has heretofore been proposed to add to cream before whipping, mixtures containing lemon juice or tartaric acid. Such substances, however, are not satisfactory in that they impart a foreign taste and they give no controllable method of attaining the desired degree of acidity. In accordance with this invention it has been found that the desired results can be obtained by using inorganic acids, since the buffering qualities of the milk permit the use of such acids without detrimental effects. Any such common acid may be used such as sulphuric, phosphoric or hydrochloric, by being added to the milk to the desired acidity before whipping.

When using this whipping gas the presence of the carbon dioxide in the mixture, therefore, by decreasing the pH value of the mixture, tends to increase the stability thereof. In general, however, I have found that in using the maximum amount of carbon dioxide which taste permits the cream is still insufficiently acid to produce the optimum effect. On this account I have found it also desirable to add to the mixture an acid in sufficient quantities still further to reduce the pH value. Among the acids available, hydrochloric acid possesses certain distinct advantages and is therefore greatly to be preferred. First because it is the acid of digestion and hence introduces into the cream no foreign substance whatever, second, it is highly soluble and in the proportions here used does not precipitate. This acid gives the further distinct advantage that it may be used in gaseous form and may be mixed with the other content of the whipping gas, without separation and without making it necessary to acidify the cream as a separate preliminary step.

The preferred mixture, therefore, is acidified by adding sufficient hydrochloric acid to the mixture so that in use it will reduce the pH value to substantially 5.7 to 5.4 at which the maximum stability and effectiveness of the mixture is obtained.

The reason why the greater acidity produces a greater stability is not definitely understood, but it is known that the condition of casein in solution varies greatly with the acidity of the liquid and this greater durability may be due to the fact that the moderate acidity referred to hardens the casein film of the gas bubbles and releases more free casein with which to produce films. Casein as it exists in milk is believed to exist in the form of a calcium caseinate and it may be that the use of the acid referred to releases the casein as a free casein thus providing more casein for film formation. If the acidity be still further increased, as for example down to a pH 4.7 all the calcium is broken away from the casein and the product has a sour taste, the casein becomes insoluble and its colloidal properties are at a minimum.

Since certain changes may be made in carrying out the above method without departing from the scope of the invention, it is intended that all matter contained in the above description shall be interpreted as illustrative and not in a limiting sense.

Having described my invention, what I claim as new and desire to secure by Letters Patent, is:

1. A cream whipping gas containing nitrous oxide and between 15 and 25% of carbon dioxide, the nitrous oxide being at least the major part of the remainder.

2. A cream whipping gas according to claim 1 containing hydrochloric acid gas in quantity not to exceed that required to bring the cream with which it is to be used to pH 5.5.

3. A gas according to claim 1 containing nitrogen not to exceed 40%.

4. A gas according to claim 1 containing nitrogen not to exceed 40% and containing hydrochloric acid gas in quantity not to exceed that required to bring the cream with which it is to be used to pH 5.5.

5. The process of whipping cream which comprises dissolving in the cream under pressure a gas containing nitrous oxide and between 15 and 25% of carbon dioxide and then releasing the cream from pressure.

6. A process according to claim 5 in which the gas contains between 15 and 25% of carbon dioxide and not more than 40% of nitrogen.

7. A process according to claim 5 in which the gas contains between 15 and 25% of carbon dioxide and not more than 40% of nitrogen and in which the cream before releasing is brought to an acidity not more acid than 5.5.

ISAAC M. DILLER.